United States Patent [19]

Raimondi

[11] 4,076,259

[45] Feb. 28, 1978

[54] STATIC SEALING MECHANISM FOR LIQUID NATURAL GAS COMPRESSORS AND HYDROGEN COOLED GENERATORS

[75] Inventor: Albert A. Raimondi, Monroeville, Pa.

[73] Assignee: Westinghouse Electric Corporation, Pittsburgh, Pa.

[21] Appl. No.: 736,804

[22] Filed: Oct. 29, 1976

[51] Int. Cl.² ............................................. F16J 15/34
[52] U.S. Cl. .......................................... 277/3; 277/27; 277/74; 277/75
[58] Field of Search ............... 277/3, 27, 15, 74, 75, 277/77, 134, 83

[56] References Cited

U.S. PATENT DOCUMENTS

| | | | |
|---|---|---|---|
| 3,051,497 | 8/1962 | Wigg et al. | 277/3 |
| 3,062,554 | 11/1962 | McGahan et al. | 277/27 X |
| 3,093,382 | 6/1963 | Macks | 277/74 X |
| 3,410,565 | 11/1968 | Williams | 277/15 X |
| 3,511,510 | 5/1970 | Lindeboom | 277/27 |
| 3,622,164 | 11/1971 | Herbert et al. | 277/28 X |
| 3,679,217 | 7/1972 | Lesiecki | 277/15 X |
| 3,759,532 | 9/1973 | Lindeboom | 227/27 |
| 3,926,442 | 12/1975 | Muller | 277/75 X |
| 3,937,477 | 2/1976 | Gyory | 277/25 |
| 3,963,247 | 6/1976 | Nommensen | 277/16 |

FOREIGN PATENT DOCUMENTS 1,012,085  12/1965  United Kingdom ................. 277/27

Primary Examiner—Robert S. Ward, Jr.
Attorney, Agent, or Firm—J. W. Keen

[57] ABSTRACT

A system preventing high pressure fluid leakage from a liquid natural gas compressor casing or hydrogen cooled generator casing to the atmosphere. Sealing the clearance between a non-rotating shaft and the casing through which it extends is provided by a multi-faced piston which can be axially displaced to contact a sleeve or shoulder which is attached to and surrounds a given length of the shaft. The multi-faced piston is slidably actuated to the open, unsealed position during shaft rotation and to the closed, sealed position during non-rotation of the shaft. This is accomplished by a series of conduits and valves which direct high pressure and low pressure gas against the appropriate faces of the multi-faced piston.

14 Claims, 4 Drawing Figures

STATIC SEALING MECHANISM FOR LIQUID NATURAL GAS COMPRESSORS AND HYDROGEN COOLED GENERATORS

BACKGROUND OF THE INVENTION

1. Field of the Invention

This invention relates to means for preventing fluid leakage from a shaft opening in a compressor casing or hydrogen cooled generator casing and more particularly to a sealing mechanism which utilizes a static seal piston during non-rotation of the shaft.

2. Description of the Prior Art

In axial compressors and hydrogen cooled generators the rotor shaft ends must be brought out of a fluid tight enclosure or casing, necessitating the use of some means to prevent escape of compressed fluid along the shaft to the atmosphere. During shaft rotation, a ring seal is commonly used. When shaft rotation ceases, it may still be desirable to prevent leakage if the compressed fluid within the casing is expensive and cannot be drawn off and trapped in another enclosure. For axial compressors used in refrigeration systems and for hydrogen cooled generators it is inconvenient and undesirable to draw off and trap the compressed fluid in another enclosure during non-rotation of the shaft. Ring seals and rubbing seals have often been used to trap the compressed fluids within the casings during shaft non-rotation as well as during shaft rotation, but these methods were judged not to be entirely satisfactory for all modes of operation.

The ring seal utilizes a set of annular plates which surround the shaft and are supplied with oil under pressure. The oil is distributed around the shaft by the annular plates with some oil being forced both ways along the shaft through a small clearance between the plates and shaft, thus preventing escape of compressed fluid from the casing. The ring seal containment method functions satisfactorily if the oil supply to the ring seal is maintained at a higher pressure than the pressure of the compressed fluid held within the casing.

The rubbing seal utilizes a sealing material which is held in contact with the shaft or collar attached thereto. The interface between the sealing material and shaft requires lubrication to prevent excessive heat generation, material failure, and rapid depletion of the sealing material. Even with lubrication the rubbing seal requires frequent and periodic replacement and often does not have sealing capability comparable to that of the ring seal.

In closed loop refrigeration systems when the compressor speed is reduced below the normal operating speed for either complete stopping or turn gear operation, the refrigerant pressure within the compressor can increase because of the phase change from liquid to gas of a large portion of the refrigerant trapped within the refrigeration loop. When natural gas is used as a refrigerant and the compressor speed is decreased below the normal operating speed, the compressor suction pressure can increase from 68 psig to 480 psig. Since the ring seal method requires the seal fluid pump to provide a higher discharge pressure than that of the natural gas, the seal fluid pump would consume a great deal of power when the compressor was not in the normal mode of operation. Another factor which makes the ring seal an unattractive sealing method during compressor shutdown is the enormous volume of sealing fluid required for large, axial compressor shafts and large generator shafts. The large shaft size and accompanying surface interface speeds also eliminate the rubbing seal from consideration because of its high wear rate and relatively large degree of leakage along the shaft.

A similar static seal piston is the topic of a copending application filed Nov. 29, 1976, having Serial No. 736,803, having the same assignee as the present application and having the following inventors: A. A. Raimondi, H. N. Kaufman, and N. J. Wood. A feature of the similar static seal piston is that if the ring seal or other dynamic sealing device fails to prevent leakage during shaft rotation, the static seal piston would automatically slide to the closed, sealing position severely damaging the static seal piston, sleeve, shaft shoulder, or deformable element. Rather than overhauling the sealing mechanism after such a ring seal failure, it may be preferable to prevent automatic closure at the expense of losing some of the sealed fluid in leakage to the atmosphere while the shaft is brought to rest.

SUMMARY OF THE INVENTION

In accordance with the present invention, a sealing system is provided for preventing leakage between an axial flow compressor shaft or a hydrogen cooled generator shaft and a surrounding fluid-tight casing during the stationary operating mode of the shaft. The invention generally comprises a rotatable shaft which extends through a non-rotatable casing, a dynamic sealing apparatus which prevents compressed fluid leakage during shaft rotation, a seating member which forms a radial extension to the shaft for a selected length of the shaft, a multi-faced static seal piston which surrounds a predetermined length of the shaft and provides a mechanical seal against compressed fluid leakage from the casing by axially contacting the seating member during non-rotation of the shaft, and a set of valved lines which can expose selected axially opposite faces of the static seal piston to either the compressed fluid pressure or atmospheric pressure.

The static seal piston slides axially into contact with the seating member when one face of the piston is exposed to the atmosphere and an opposing face of the piston is exposed to the compressed fluid. An effective mechanical seal is thus provided without consuming power for maintaining that seal with the sealing quality being further enhanced as the compressed fluid pressure rises and drives the static seal piston into the seating member with increasing force.

By utilizing this static sealing mechanism, automatic closure of the static seal piston will not occur if dynamic sealing capability is lost through ring seal "blow out" or other catastrophic failure. Furthermore, this invention requires only minute amounts of sealed fluid to actuate the static seal piston. By selecting the static sealing mechanism which incorporates the shaft shoulder rather than the sleeve as the seating device, the sleeve and locking nut can be eliminated and a smaller ring seal requiring less sealing oil can be used. The shaft shoulder option also permits easy adaptation of the sealing mechanism to hydrogen cooled generators which presently do not employ sleeves.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
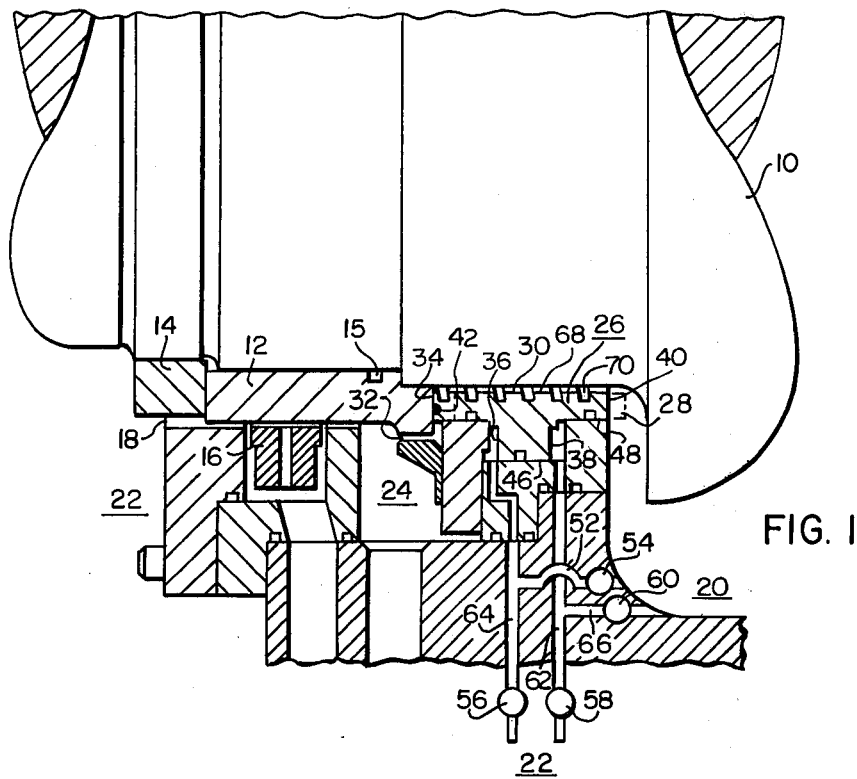
FIG. 1 is a partial sectioned view of the sealing mechanism having a static seal piston which has two faces of equal area A1 and two faces of equal area A2 wherein one of the faces seats against a sleeve which surrounds a shaft where the shaft extends through a fluid-tight casing.

Referring now to the drawings in detail, FIG. 1 shows a partial sectioned view of an axial compressor whose rotatable shaft 10 is surrounded by an attached to sleeve 12 of predetermined length. Sleeve 12 is held in place by locking nut 14 which is secured to shaft 10 with sleeve 12 sealed to shaft 10 by a sealing member 15, or, for example, an O-ring. During shaft 10 rotation, ring seal 16 distributes sealing oil in clearance 18 which exists between the ring seal 16 and the sleever 12. Since the sealing oil is maintained at a higher pressure than that of the sealed fluid in compressor cavity 20, a portion of the sealing fluid flows toward atmosphere 22 and the remaining sealing fluid flows toward compressor drain cavity 24.

During shaft 10 rotation, the pressure in compressor drain cavity 24 is equalized with the pressure in compressor cavity 20 by static seal piston 26 being held in the open, unsealing position 28 allowing sealed gas to pass through annular space 30 and opening 32. When shaft 10 rotation ceases, static seal piston 26 is displaced axially to the closed, sealing position with face 34 making contact with sleeve 12. In addition to face 34, static seal piston 26 also has faces 36, 38, and 40. Faces 36 and 38 are of area A2 and faces 34 and 40 are of area A1, where A2 is greater than A1. The sealing characteristics of this static sealing system are improved by the mounting of a deformable element 42 or, by example elastomer on face 34. When static seal piston 26 is moved to the closed position, the deformable element 42 deforms on contact with sleeve 12 thus providing an excellent sealing interface. Static seal piston 26 is moved axially by sliding on faces 44, 46, and 48.

Static seal piston 26 is actuated to the open, unsealing position 28 by allowing sealed fluid to flow from compressor cavity 20 through both conduit 52 and open valve 54 to face 36 while simultaneously closing valve 56, opening valve 58, and closing valve 60 allowing any sealed fluid in contact with face 38 and within conduit 62 to pass to atmosphere 22. When it is desired to move static seal piston 26 to the closed position, valve 54 is closed, valve 56 is opened to allow any sealed fluid which is in contact with face 36 and within conduit 65 to flow to atmosphere 22, valve 58 is closed, and valve 60 is opened to allow high pressure sealed fluid to flow from compressor cavity 20 through both conduits 66 and valve 60 into contact with face 38. To minimize and throttle sealed fluid flow through annular space 30 between shaft 10 and static seal piston inside diameter 68, a labyrinth wind back 70 or thread, by example, is cut on inside diameter 68. The labyrinth windback has further utility in that it cooperates with shaft 10, during rotation, and supplies a "pumping" action that prevents sealing fluid ingress into the compressor's interior.

Figure 2:
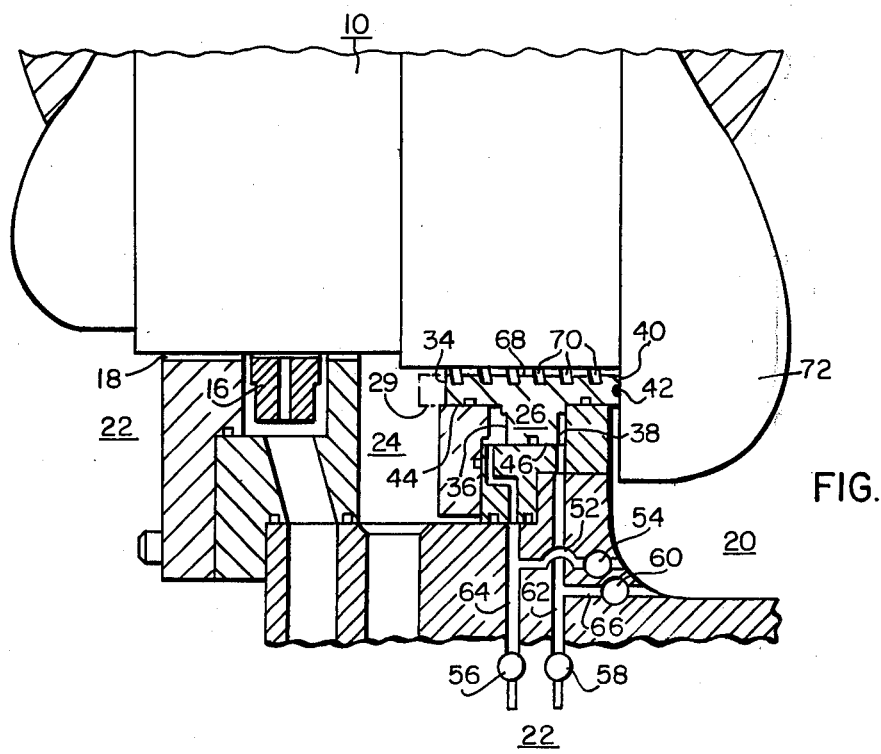
FIG. 2 is a partial sectioned view of a sealing mechanism having a static seal piston which has two faces of equal area A1 and two faces of equal area A2 wherein one of the faces seats against a shaft shoulder.

The apparatus shown in FIG. 2 is identical to that in FIG. 1 with the following exceptions: face 40 of static seal piston 26 seats against shaft shoulder 72 when static seal piston is moved to the closed, sealed position thus eliminating the need for sleeve 12 and locking nut 14;

the deformable element 42 is attached to face 40 rather than face 34;

the open, unsealing position is 29; and valves 54, 56, 58 and 60 are now operated in the reverse order that they were in FIG. 1 in order to statically seat piston 26 against shaft shoulder 72 rather than sleeve 12.

Figure 3:
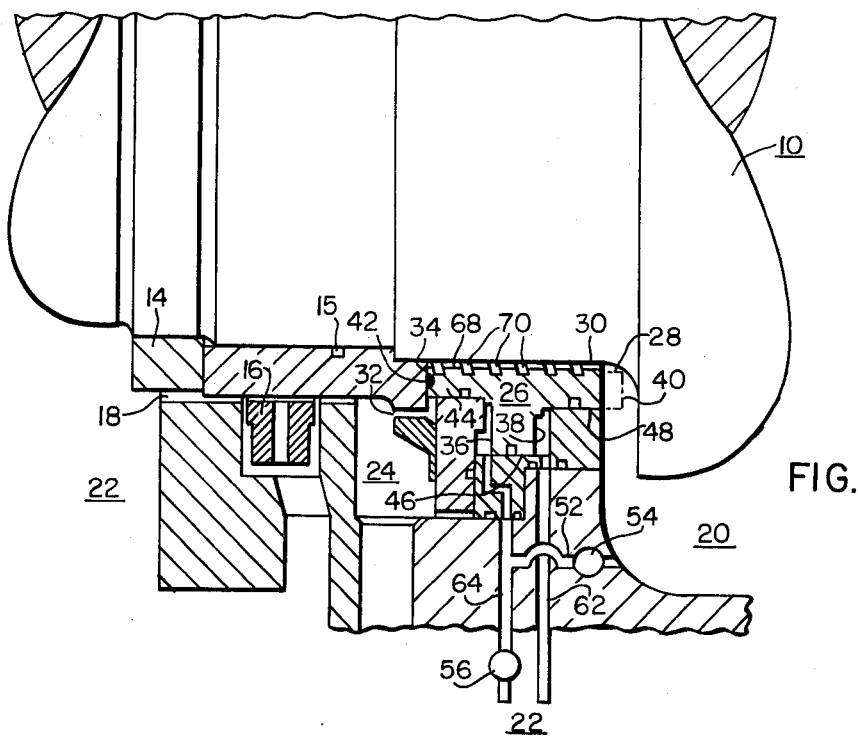
FIG. 3 is a partial sectioned view of a sealing mechanism having a static seal piston which has four faces of unequal area wherein one of the faces seats against a sleeve which surrounds a shaft where the shaft extends through a fluid-tight casing.

FIG. 3 is identical to FIG. 1 with the following exceptions:

face 38 is in constant fluid communication with atmosphere 22;

the area of face 36 is greater than the area of face 38, the area of face 38 is greater than the area of face 40, and the area of face 40 is greater than the area of face 34.

Figure 4:
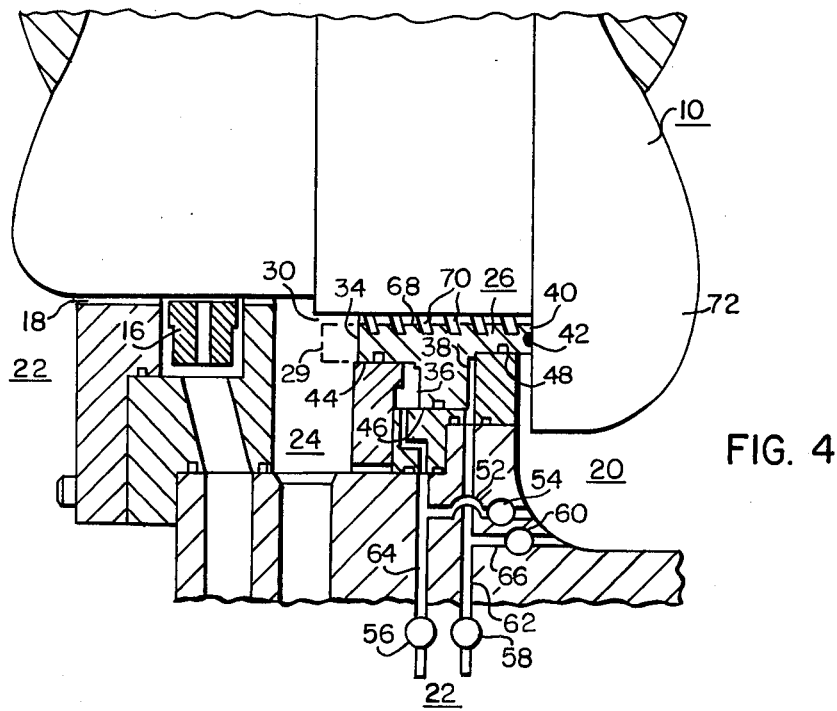
FIG. 4 is a partial sectioned view of a sealing mechanism having a static seal piston which has four faces of unequal area wherein one of the faces seats against a shaft shoulder.

FIG. 4 is identical with FIG. 2 except that the area of face 38 is greater than the area of face 36, the area of face 36 is greater than the area of face 34, and the area of face 34 is greater than the area of face 40.

What is claimed is:

1. An apparatus containing a sealed fluid comprising:
a nonrotatable, fluid-tight casing which envelops said sealed fluid;
a rotatable shaft extending through said casing;
dynamic sealing means for preventing sealed fluid leakage from the casing's shaft opening during shaft rotation, said dynamic sealing means being selectively actuatable and having sealing capability independent of said shaft rotation;
a piston disposed around a predetermined length of said shaft with an annular space therebetween, said piston having a plurality of faces extending substantially radial in relation to the shaft's axis of rotation, a first of said faces being arranged to be in contact with said sealed fluid during shaft rotation, a second and third of said faces being situated on axially opposite ends of said piston;
a seating member situated axially adjacent to said first piston face extending radially from the shaft's axis of rotation with said seating member attached to and surrounding a selected length of said shaft;
controlling means for selectively providing fluid communication to said second face from a low fluid pressure source $P_L$ and a high fluid pressure source $P_H$ creating an unbalanced axial force on said piston causing said piston to be axially displaced between a first position where said first face is in contact with said seating member during nonrotation of said shaft and a second position where said first face is in contact with said sealed fluid during shaft rotation.

2. The apparatus of claim 1, said controlling means comprising:
first valving means for regulating fluid communication between said second face and said fluid pressure source $P_L$;

second valving means for regulating fluid communication between said second face and said fluid pressure source $P_H$;

a third valving means for regulating fluid communication between said third face and said fluid pressure source $P_L$; and fourth valving means for regulating fluid communication between said third face and said fluid pressure source $P_H$.

3. The apparatus of claim 2, said seating member comprising:
a sleeve.

4. The apparatus of claim 3, wherein said first face area perpendicular to said shaft's axis of rotation is equal to A1 and said second and third face areas perpendicular to said shaft's axis of rotation are equal to A2 with A2 being greater than A1.

5. The apparatus of claim 2, said seating member comprising:
a shaft shoulder.

6. The apparatus of claim 5, wherein said first face area perpendicular to said shaft's axis of rotation is equal to A1 and said second and third face areas perpendicular to said shaft's axis of rotation are equal to A2 with A2 being greater than A1.

7. The apparatus of claim 1, wherein said third face is in fluid communication with said high pressure fluid.

8. The apparatus of claim 7, said controlling means comprising:
first valving means for regulating fluid communication between said second face and said fluid pressure $P_L$; and second valving means for regulating fluid communication between said second face and said fluid pressure $P_H$.

9. The apparatus of claim 8, said seating member comprising:
a sleeve.

10. The apparatus of claim 9, wherein said first face area perpendicular to said shaft's axis of rotation is equal to A1, said second face area perpendicular to said shaft's axis of rotation is equal to A2, and said third face area perpendicular to said shaft's axis of rotation is equal to A3 with A2 being greater than A3 and A3 being greater than A1.

11. The apparatus of claim 5, wherein said first face area perpendicular to said shaft's axis of rotation is equal to A1, said second face area perpendicular to said shaft's axis of rotation is equal to A2, and said third face area perpendicular to said shaft's axis of rotation is equal to A3 with A3 being greater than A2 and A2 being greater than A1.

12. The apparatus of claim 1, further comprising:
a deformable member attached to said first face wherein said deformable member deforms on contact with said seating member providing a fluid-tight seal between said first face and said seating member.

13. The apparatus of claim 1, further comprising:
a labyrinth wind-back formed on said piston surface surrounding said shaft wherein said labyrinth wind-back throttles said sealed fluid flow through said annular space and cooperates with said shaft during rotation to prevent sealing fluid ingress to said casing interior.

14. The apparatus of claim 1, wherein said fluid pressure source $P_H$ comprises the sealed fluid within said casing.

* * * * *